(12) United States Patent
Nakagawa

(10) Patent No.: US 8,446,501 B2
(45) Date of Patent: May 21, 2013

(54) IMAGE PICKUP APPARATUS WITH FOCUS DETECTION

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/057,361

(22) PCT Filed: Oct. 2, 2009

(86) PCT No.: PCT/JP2009/005108
§ 371 (c)(1),
(2), (4) Date: Feb. 3, 2011

(87) PCT Pub. No.: WO2010/041398
PCT Pub. Date: Apr. 15, 2010

(65) Prior Publication Data
US 2011/0141329 A1   Jun. 16, 2011

(30) Foreign Application Priority Data
Oct. 10, 2008   (JP) ................................. 2008-264059

(51) Int. Cl.
*H04N 3/14* (2006.01)
*H04N 5/335* (2011.01)

(52) U.S. Cl.
USPC .......................................... 348/294; 348/345

(58) Field of Classification Search .................. 348/294, 348/345
See application file for complete search history.

(56) References Cited

U.S. PATENT DOCUMENTS

| | | | |
|---|---|---|---|
| 4,974,008 A | 11/1990 | Nakayama et al. | |
| 5,241,167 A | 8/1993 | Suzuki et al. | |
| 5,485,004 A | 1/1996 | Suzuki et al. | |
| 6,707,994 B2 | 3/2004 | Nakagawa | |
| 6,781,632 B1 * | 8/2004 | Ide | 348/345 |
| 6,819,360 B1 * | 11/2004 | Ide et al. | 348/340 |
| 7,746,394 B2 | 6/2010 | Sugiyama | |
| 7,920,781 B2 * | 4/2011 | Onuki | 396/121 |

(Continued)

FOREIGN PATENT DOCUMENTS

| | | |
|---|---|---|
| EP | 1906656 A2 | 4/2008 |
| EP | 1906657 A2 | 4/2008 |

(Continued)

OTHER PUBLICATIONS

Supplementary European Search Report, dated Jun. 29, 2012, in European Patent Application No. 09818938.4.

*Primary Examiner* — Roberto Velez
*Assistant Examiner* — Cynthia Segura
(74) *Attorney, Agent, or Firm* — Fitzpatrick, Cella, Harper & Scinto

(57) ABSTRACT

The image pickup apparatus includes an image pickup element 106 including image pickup pixels photoelectrically converting an object image formed by a light flux from an image pickup optical system 202 and focus detection pixels photoelectrically converting two images formed by two divided light fluxes of the light flux from the image pickup optical system. The apparatus further includes an image generator 112 generating an image based on first pixel signals, a focus controller 112 performing focus control for the image pickup optical system based on second pixel signals. A signal processor 112 outputs signals read out from the image pickup pixels after each charge accumulation operation of the image pickup pixels for a predetermined time period as the first pixel signals, and outputs signals obtained by plural charge accumulation operations of the focus detection pixels as the second pixel signals.

9 Claims, 12 Drawing Sheets

U.S. PATENT DOCUMENTS

| | | | | |
|---|---|---|---|---|
| 8,094,232 B2* | 1/2012 | Kusaka | | 348/349 |
| 8,139,144 B2* | 3/2012 | Utagawa | | 348/352 |
| 8,164,642 B2* | 4/2012 | Kusaka | | 348/222.1 |
| 8,164,679 B2* | 4/2012 | Kusaka | | 348/345 |
| 2006/0104621 A1 | 5/2006 | Nakata | | |
| 2007/0206940 A1* | 9/2007 | Kusaka | | 396/128 |
| 2007/0237429 A1* | 10/2007 | Kusaka | | 382/312 |
| 2007/0242147 A1 | 10/2007 | Kawai | | |
| 2008/0074534 A1* | 3/2008 | Kusaka | | 348/364 |
| 2008/0084483 A1 | 4/2008 | Kusaka | | |
| 2008/0291311 A1* | 11/2008 | Kusaka | | 348/308 |
| 2009/0086084 A1* | 4/2009 | Komaba et al. | | 348/349 |
| 2009/0096903 A1* | 4/2009 | Kusaka | | 348/302 |
| 2009/0303553 A1 | 12/2009 | Sugiyama | | |
| 2010/0194967 A1* | 8/2010 | Amano | | 348/345 |

FOREIGN PATENT DOCUMENTS

| | | |
|---|---|---|
| JP | 1-107226 | 4/1989 |
| JP | 4-175619 | 6/1992 |
| JP | 2005-295381 | 10/2005 |
| JP | 2006-261929 | 9/2006 |
| JP | 2008-85535 | 4/2008 |
| JP | 2008-85738 | 4/2008 |

\* cited by examiner

IMAGE PICKUP APPARATUS WITH FOCUS DETECTION

TECHNICAL FIELD

The present invention relates to an image pickup apparatus such as a digital camera and a video camera, and particularly to an image pickup apparatus which performs phase difference detection using an image pickup element.

BACKGROUND ART

As an AF (auto focus) system of an image pickup apparatus, there is known a TTL phase difference detection system. In the TTL phase difference detection system, part of a light flux from an image pickup optical system is divided into two light fluxes, and a shift amount (phase difference) between two images formed by the two divided light fluxes is obtained. Then, a defocus amount indicating a focus state of the image pickup optical system is calculated based on the phase difference, and a driving amount of a focus lens necessary for approaching the defocus amount to 0 to obtain an in-focus state is calculated.

There has been proposed an image pickup apparatus which performs AF using such a TTL phase difference detection method by providing pixels for the phase difference detection (hereinafter, referred to as focus detection pixels) in an image pickup element to obtain an object image, without providing any exclusive light-receiving sensor for photoelectrically converting the two images.

When the phase difference detection (in other words, focus detection) is performed by using the focus detection pixels while obtaining an image by the image pickup element, the focus detection pixels receive only part of a light flux for normal image pickup, and hence an exposure amount of the focus detection pixels easily becomes low. Especially, when the focus detection is carried out while obtaining a moving image of a low-brightness object, a detection rate (frame rate) of the moving image is high, generally 30 fps to 60 fps, and hence a shortage occurs in exposure amount of the focus detection pixels if the focus detection pixels are exposed at the same rate. Thus, effective sensitivity and a low-brightness limit of the focus detection pixels are lowered.

Japanese Patent Laid-Open No. 2006-261929 discloses an image pickup apparatus which performs, when an image of a low-brightness object is captured, a read-out operation of image signals by alternately switching a live view read-out mode and an addition read-out mode for each frame. In this image pickup apparatus, an image is displayed on a display element by using live view image signals read out in a period of the live view read-out mode, and an AF controller performs focus detection based on added brightness image signals read out in a period of the addition read-out mode.

Japanese Patent Laid-Open No. 2005-295381 discloses an image pickup apparatus which sets image pickup pixels for obtaining a normal image and measuring pixels separately from each other, and reads out outputs from these pixels at different frame rates by different signal processing circuits. In this image pickup apparatus, an exclusive signal line is provided for reading out signals from the measuring pixels.

However, in the image pickup apparatus disclosed in Japanese Patent Laid-Open No. 2006-261929, the live view image signals used for the image displaying and the added brightness image signals used for the focus detection are alternately read out, and hence a frame rate for image displaying is lowered. Further, the addition read-out of the outputs from the focus detection pixels is performed for the low-brightness object, and hence the frame rate for the image display is changed.

Moreover, in the image pickup apparatus disclosed in Japanese Patent Laid-Open No. 2005-295381, the outputs from the image pickup pixels and measuring pixels are processed by the different signal processing circuits, and hence a circuit configuration is complex as compared with a case where signals from the image pickup pixels and measuring pixels are processed by one signal processing circuit.

SUMMARY OF INVENTION

The present invention provides an image pickup apparatus capable of improving effective sensitivity and a low-brightness detection limit of focus detection pixels without using any complex circuit configuration.

The present invention provides as one aspect thereof an image pickup apparatus including an image pickup element configured to include image pickup pixels and focus detection pixels, the image pickup pixels photoelectrically converting an object image formed by a light flux from an image pickup optical system, and the focus detection pixels photoelectrically converting two images formed by two divided light fluxes of the light flux from the image pickup optical system, an image generator configured to generate an image based on first pixel signals, a focus controller configured to perform focus control for the image pickup optical system based on second pixel signals, and a signal processor configured to output signals read out from the image pickup pixels after each charge accumulation operation of the image pickup pixels for a predetermined time period as the first pixel signals, and to output signals obtained by plural charge accumulation operations of the focus detection pixels as the second pixel signals.

The present invention provides as another aspect thereof a method for controlling an image pickup apparatus including an image pickup element configured to include image pickup pixels and focus detection pixels, the image pickup pixels photoelectrically converting an object image formed by a light flux from an optical pickup optical system and the focus detection pixels photoelectrically converting two images formed by two divided light fluxes of the light flux from the image pickup optical system. The method includes
a step of generating an image based on first pixel signals, a step of performing focus control for the image pickup optical system based on second pixel signals, and a step of outputting signals read out from the image pickup pixels after each charge accumulation operation of the image pickup pixels for a predetermined time period as the first pixel signals, and of outputting signals obtained by plural charge accumulation operations of the focus detection pixels as the second pixel signals.

Other aspects of the present invention will become apparent from the following description and the attached drawings.

DESCRIPTION OF EMBODIMENTS

Exemplary embodiments of the present invention will hereinafter be described with reference to the accompanying drawings.

[Embodiment 1]

Figure 1:
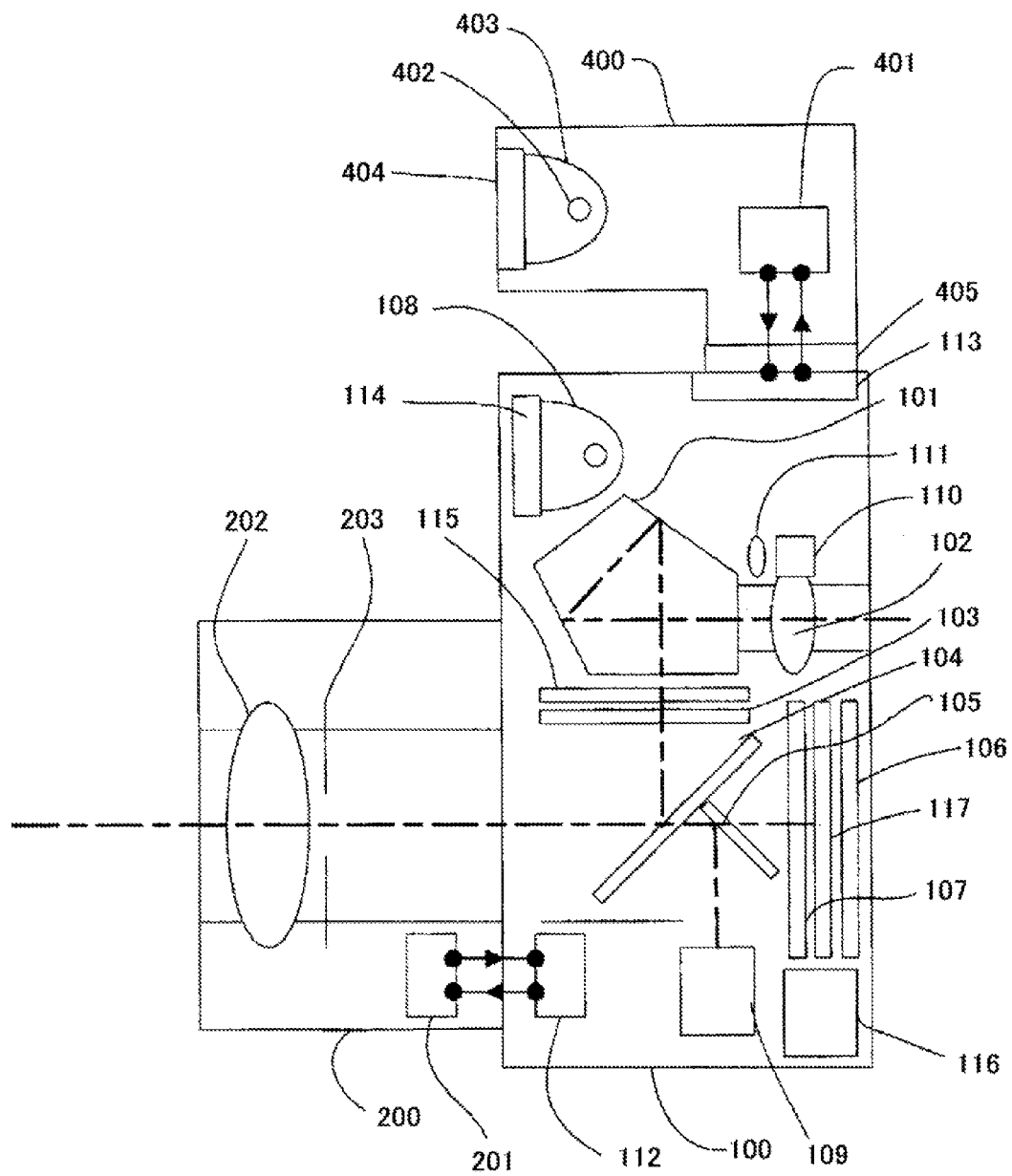
FIG. 1 is a FIGURE showing a configuration of a camera which is Embodiment 1 of the present invention.

FIG. 1 shows a configuration of a single lens reflex digital camera as an image pickup apparatus which is a first embodiment (Embodiment 1) of the present invention. In FIG. 1, reference numeral 100 denotes a camera body. Reference numeral 101 denotes an optical viewfinder forming an erected normal image, reference numeral 102 denotes an eyepiece lens, and reference numeral 103 denotes a viewfinder screen.

Reference numeral 104 denotes a main half mirror (hereinafter, referred to as "main mirror") which deflects a light flux from an image pickup optical system, which will be described later, to the viewfinder optical system. Reference numeral 105 denotes a sub-mirror which deflects the light flux that has passed through the main mirror 104 to a focus detection unit, which will be described later. The main mirror 104 and the sub-mirror 105 constitute an optical path dividing optical system. Reference numeral 106 denotes an image pickup element such as a CCD sensor or a CMOS sensor, and reference numeral 107 denotes a focalplane shutter which controls an exposure amount of the image pickup element 106.

Reference numeral 108 denotes a flash unit built in the camera body 100. Reference numeral 109 denotes the focus detection unit. The focus detection unit 109 includes at least a pair of pixel lines (line sensors). The pair of line sensors photoelectrically converts a pair of images formed by the light flux from the image pickup optical system to output a pair of image signals.

Reference numeral 110 denotes a photometry sensor which measures object brightness, and reference numeral 111 denotes a photometry lens which forms an object image on the photometry sensor 110 with a light flux from an object.

Reference numeral 112 denotes a camera microprocessor as controller which controls various operations of the camera body 100. Reference numeral 113 denotes an accessory shoe on which an accessory such as an external flash unit 400 is mounted. Reference numeral 114 denotes a Fresnel lens provided to the built-in flash unit 108.

Reference numeral 115 denotes a viewfinder display unit which displays various information for an observer viewing through the optical viewfinder. Reference numeral 116 denotes an external display unit disposed on an outer surface of the camera body 100, which serves as an electronic viewfinder (EVF). Reference numeral 117 denotes a low-pass filter disposed at the front of the image pickup element 106.

Reference numeral 200 denotes an interchangeable lens detachably attached to the camera body 100. A configuration of the interchangeable lens 200 will be described below.

Reference numeral 201 denotes a lens microprocessor which controls various operations of the interchangeable lens 200, and communicates with the camera microprocessor 112 via communication contacts. Reference numeral 202 denotes the image pickup optical system which includes plural lenses such as a magnification-varying lens and a focus lens. Reference numeral 203 denotes an aperture stop which performs light amount adjustment. FIG. 1 shows only one lens for simplicity.

In the external flash unit 400, reference numeral 401 denotes a flash microprocessor which controls operations of the external flash unit 400. Reference numeral 402 denotes a discharge arc tube such as a xenon tube, and reference numeral 403 denotes a reflector which reflects a light flux emitted from the arc tube 402 toward the object. Reference numeral 404 denotes a flash panel which controls light distribution of the light flux reflected by the reflector 403. Reference numeral 405 denotes a mounting member for mounting on the accessory shoe 113 of the camera body 100.

In this embodiment, the camera body 100 (camera microprocessor 112) communicates with the interchangeable lens 200 (lens microprocessor 201) and the external flash unit 400 (flash microprocessor 401). Thus, the camera microprocessor 112 performs various controls using various information obtained from the interchangeable lens 200 and the external flash unit 400.

Figure 2:
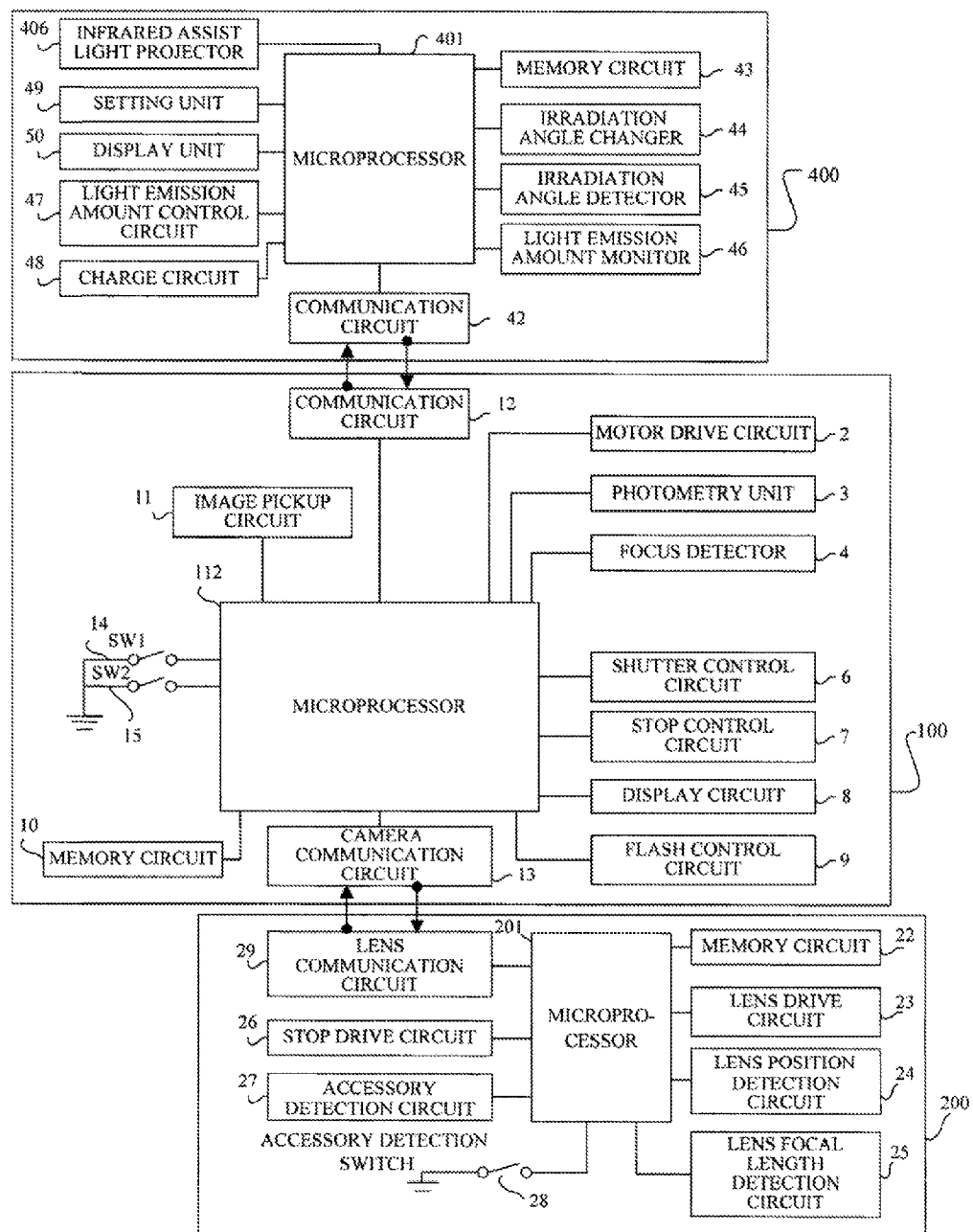
FIG. 2 is a block diagram showing an electrical configuration of the camera of Embodiment 1.

FIG. 2 shows a circuit configuration of an image pickup system constituted by the camera body 100, the interchangeable lens 200 and the external flash unit 400.

In the camera body 100, reference numeral 112 denotes the camera microprocessor described above. Reference numeral 2 denotes a motor drive circuit which drives a movable portion of the camera body 100. Reference numeral 3 denotes a photometry unit which measures object brightness which is included in the photometry sensor 110 shown in FIG. 1. Reference numeral 4 denotes a focus detector which detects a focus state of the interchangeable lens 200, and includes the focus detection unit 109 shown in FIG. 1.

Reference numeral 6 denotes a shutter control circuit which controls the focalplane shutter 107. Reference numeral 7 denotes a stop control circuit which controls the aperture stop 203. Reference numeral 8 denotes a display circuit which displays a state of the camera body 100, and controls the viewfinder display unit 115 and the external display unit 116.

Reference numeral 9 denotes a flash control circuit which controls the built-in flash unit 108. Reference numeral 10 denotes a memory circuit which stores various setting values for the camera body 100. Reference numeral 11 denotes an image pickup circuit which includes the image pickup element 106 and a drive circuit thereof.

The camera microprocessor 112 serves as a signal processor performing signal processing such as read-out processing of pixel signals from the image pickup element 106. The camera microprocessor 112 also serves as an image generator generating, based on the pixel signals from the image pickup pixels (described below) in the image pickup element 106, an electronic viewfinder image (live view image) and a recording image.

The camera microprocessor 112 further serves as a focus controller detecting, based on the pixel signals from focus detection pixels (described below) in the image pickup element 106, a focus state of the image pickup optical system 102 to perform focus control according to the focus state.

The camera microprocessor 112 also can detect the focus state of the image pickup optical system 102 based on a focus detection result of the focus detector 4 to perform focus control according to the focus state.

Reference numeral 12 denotes a communication circuit which communicates with the external flash unit 400. Reference numeral 13 denotes a camera communication circuit which communicates with the interchangeable lens 200.

Reference numeral 14 (SW 1) denotes a switch for starting an image pickup preparation operation, and reference numeral 15 (SW 2) denotes a switch for starting image pickup processing.

The built-in flash unit 108 illuminates the object when image pickup is performed in a case where the external flash unit 400 is not mounted to the camera body 100. For focus detection, the built-in flash unit 108 can project AF assist light to the object.

In the interchangeable lens 200, reference numeral 201 denotes the above-described lens microprocessor, and reference numeral 22 denotes a memory circuit which stores various setting values for the interchangeable lens 200. Reference numeral 23 denotes a lens drive circuit which drives the focus lens in the interchangeable lens 200. Reference numeral 24 denotes a lens position detection circuit which detects a position of the focus lens. Reference numeral 25 denotes a lens focal length detection circuit which detects a focal length of the interchangeable lens 200.

Reference numeral 26 denotes a stop drive circuit which drives the aperture stop 203, and reference numeral 27 denotes an accessory detection circuit which detects an accessory mounted on the interchangeable lens 200 via an accessory detection switch 28. Reference numeral 29 denotes a lens communication circuit which communicates with the camera body 100 and the accessory mounted on the interchangeable lens 200.

The camera microprocessor 112 sends various control signals to the lens microprocessor 201 via the camera and lens communication circuits 13 and 29. The lens microprocessor 201 sends identification information of the interchangeable lens 200, information of the accessory mounted on the interchangeable lens 200 and information of various setting values for the interchangeable lens 200 to the camera microprocessor 112 via the camera and lens communication circuits 13 and 29.

In the external flash unit 400, reference numeral 401 denotes a flash microprocessor which controls various operations of the external flash unit 400, and reference numeral 42 denotes a communication circuit which communicates with the camera body 100. Reference numeral denotes a memory circuit which stores various setting values for the external flash unit 400.

Reference numeral 44 denotes an irradiation angle changer which changes an irradiation range of flash light according to the state of the camera body 100 on which the external flash unit 400 or the state of the interchangeable lens 200 is mounted. Reference numeral 45 denotes an irradiation angle detector which detects a setting value of the irradiation range.

Reference numeral 46 denotes a light emission amount monitor which directly monitors an amount of emitted light of the external flash unit 400. Reference numeral 47 denotes a light emission amount control circuit which controls the amount of emitted light. Reference numeral 48 denotes a charge circuit which charges a flash capacitor (not shown). Reference numeral 49 denotes a setting part which sets a state of the external flash unit 400. Reference numeral 50 denotes a display unit which displays the set state of the external flash unit 400. Reference numeral 406 denotes an infrared assist light projector built-in the external flash unit 400.

The flash microprocessor 401 sends various setting information of the external flash unit 400 to the camera microprocessor 112 via the communication circuits 42 and 12. The camera microprocessor 112 sends, to the flash microprocessor 401 via the communication circuits 42 and 12, a control signal for causing the infrared assist light projector 406 to project infrared light.

The image pickup element 106 in this embodiment includes plural image pickup pixels which photoelectrically convert an object image formed by the light flux from the image pickup optical system contained in the interchangeable lens 200. The image pickup element 106 further includes plural focus detection pixels which photoelectrically convert two images formed by two divided light fluxes of the light flux from the image pickup optical system.

Figure 3A:
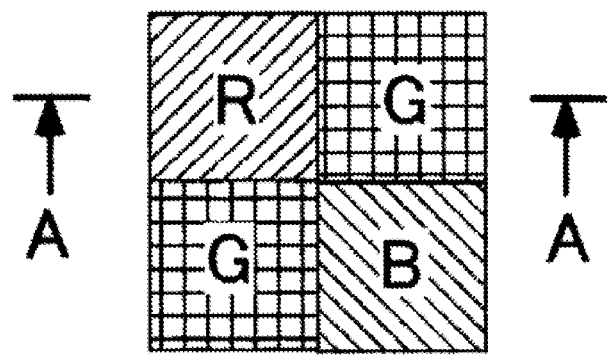
FIGS. 3A and 3B are a front view and a sectional view of image pickup pixels provided in an image pickup element used for the camera of Embodiment 1.
Figure 3B:
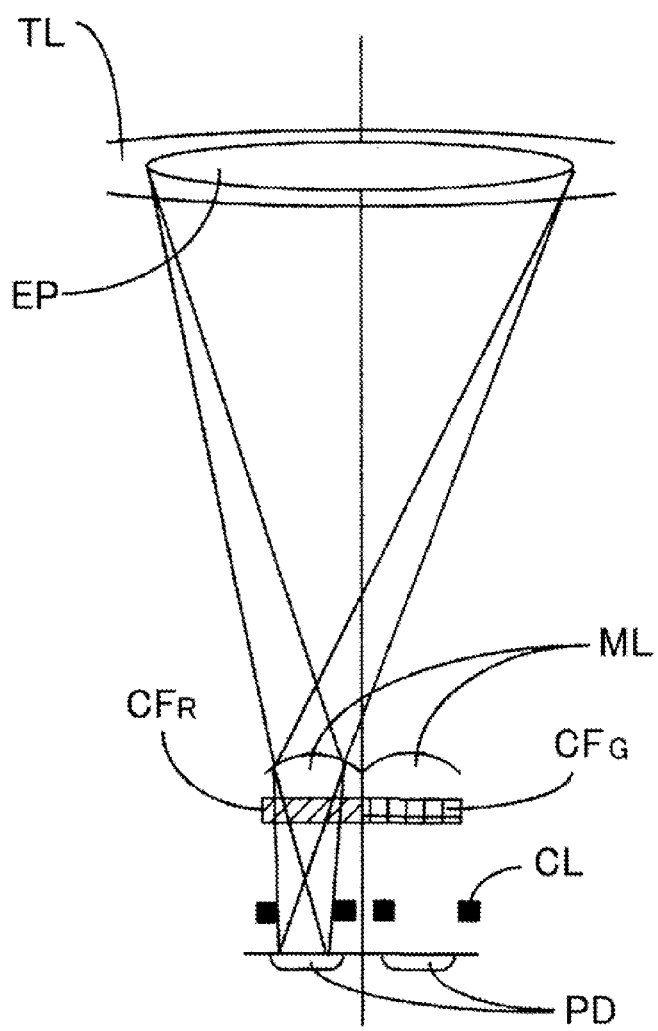

FIGS. 3A and 3B show an arrangement and a structure of the image pickup pixels. FIGS. 4A and 4B and FIGS. 5A and 5B show an arrangement and a structure of the focus detection pixels. FIG. 3A shows the image pickup pixels of 2 rows×2 columns.

In this embodiment, a two-dimensional single plate CMOS color image sensor is used as the image pickup element 106 in which primary color filters of R (Red), G (Green) and B (Blue) are arranged according to Bayer arrangement. In the Bayer arrangement, among 4 pixels of 2 rows×2 columns, two G pixels are disposed in a diagonal direction, and R and B pixels are disposed as other 2 pixels. Such a pixel arrangement of 2 rows×2 columns is repeated in the entire image pickup element 106.

FIG. 3B shows an A-A section of the image pickup pixels shown in FIG. 3A. Reference character ML denotes a microlens disposed at the front of each pixel, reference character $CF_R$ denotes the R color filter, and reference character $CF_G$ denotes the G color filter. Reference character PD schematically denotes a photoelectric converting part of the CMOS sensor. Reference character CL denotes a wiring layer for forming a signal line to transmit various signals in the CMOS sensor. Reference character TL schematically denotes the image pickup optical system.

The microlens ML and the photoelectric converting part PD of the image pickup pixel are configured to take in a light flux that has passed through the image pickup optical system TL as effectively as possible. In other words, an exit pupil EP of the image pickup optical system TL and the photoelectric converting part PD are placed in a conjugate relationship by the microlens ML, and an effective area of the photoelectric converting part PD is set large.

FIG. 3B shows a light flux entering the R pixel. The light flux that has passed through the image pickup optical system TL similarly enters each of the G pixel and the B pixel. A diameter of the exit pupil EP corresponding to each of the R, G and B image pickup pixels is enlarged to enable efficient taking-in of a light flux from the object. Thus, an S/N ratio of a signal used for generating the electric viewfinder image or the recording image can be improved.

Figure 4A:
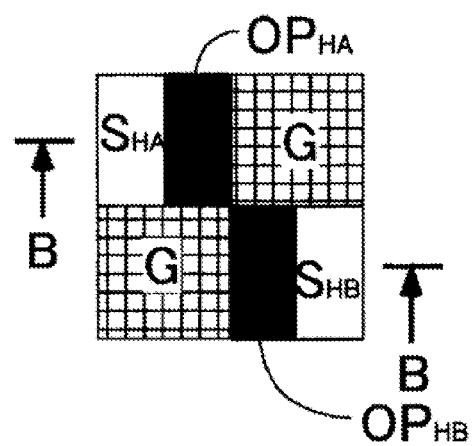
FIGS. 4A and 4B are a front view and a sectional view of focus detection pixels provided in the image pickup element.

FIG. 4A shows a pixel arrangement of 2 rows×2 columns including focus detection pixels which divide the exit pupil (that is, which perform pupil division) of the image pickup optical system in a horizontal direction (lateral direction in which a long side of the image pickup element 106 extends). The G pixel outputs a G image pickup signal which becomes a main component of brightness information. A human image recognition characteristic is sensitive to the brightness information, so that a loss of the G pixel makes image quality deterioration be easily recognized.

Conversely, the R and B pixels are pixels for mainly obtaining color information. A human is insensitive to color information, and hence image quality deterioration is difficult to be recognized even if some pixels for obtaining the color information are lost.

Thus, in this embodiment, among the pixels of 2 rows×2 columns shown in FIG. 3A, the R and B pixels are partially replaced by the focus detection pixels while the G pixels are left as an image pickup pixel. In FIG. 4A, the focus detection pixels are denoted by reference characters $S_{HA}$ and $S_{HB}$.

Figure 4B:
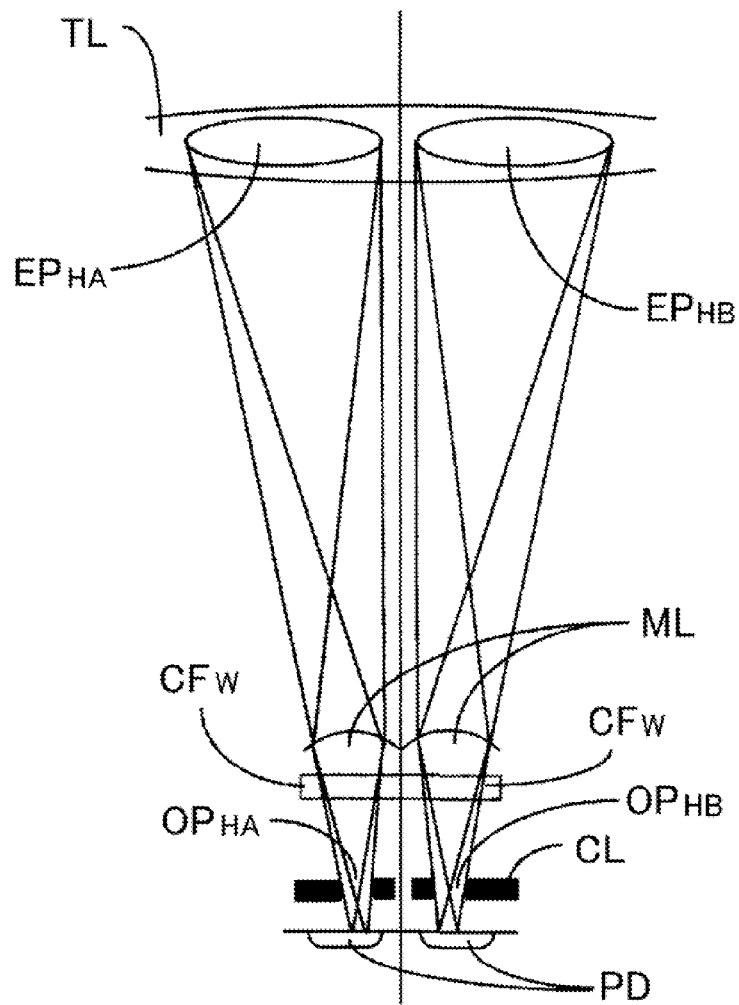

FIG. 4B shows a B-B section of the focus detection pixels shown in FIG. 4A. The microlens ML and the photoelectric converting part PD in the focus detection pixel are same in structure as the microlens ML and the photoelectric converting part PD of the image pickup pixel shown in FIG. 3B.

In this embodiment, a pixel signal from the focus detection pixel is not used for generating the electronic viewfinder image or the recording image, and hence in the focus detection pixel a transparent (white) film $CF_W$ is provided in place of a color filter. In order to provide a pupil division function to the focus detection pixel, apertures (hereinafter, referred to as "stop apertures") $OP_{HA}$ and $OP_{HB}$ formed in the wiring layer CL are formed so as to be shifted in one direction with respect to a center line of the microlens ML.

Specifically, the focus detection pixel $S_{HA}$ has the stop aperture $OP_{HA}$ shifted to the right side, and receives a light flux that has passed through a left side exit pupil area $EP_{HA}$ of the exit pupil of the image pickup optical system TL. On the other hand, the focus detection pixel $S_{HB}$ has the stop aperture $OP_{HB}$ shifted to the left side (side opposite to the aperture stop $OP_{HA}$), and receives a light flux that has passed through a right side exit pupil area $EP_{HB}$ of the exit pupil of the image pickup optical system TL. Thus, the focus detection pixels $S_{HA}$ and $S_{HB}$ can receive two images (left and right separated images) of the same object to photoelectrically convert the two images.

In the image pickup element 106, plural focus detection pixels $S_{HA}$ are regularly arranged in the horizontal direction. Hereinafter, one of the two images which is formed on the plural focus detection pixels $S_{HA}$ is referred to as "A image". Plural focus detection pixels $S_{HB}$ are also regularly arranged in the horizontal direction. The other one of the two images which is formed on the plural focus detection pixels $S_{HB}$ is referred to as "B image". Detecting a phase difference as a shift amount (including a shift direction) between two image signals corresponding to the photoelectrically converted A and B images enables calculation of a defocus amount (including a defocus direction) indicating a focus state of the image pickup optical system.

In order to detect a phase difference between the A and B images in a vertical direction (longitudinal direction), the stop aperture $OP_{HA}$ of the focus detection pixel $S_{HA}$ and the stop aperture $OP_{HB}$ of the focus detection pixel $S_{HB}$ are only required to be shifted to an upper side and a lower side, respectively. In other words, the focus detection pixels $S_{HA}$ and $S_{HB}$ shown in FIG. 4A are rotated by 90 degrees to be arranged as shown in FIG. 5A.

Figure 5A:
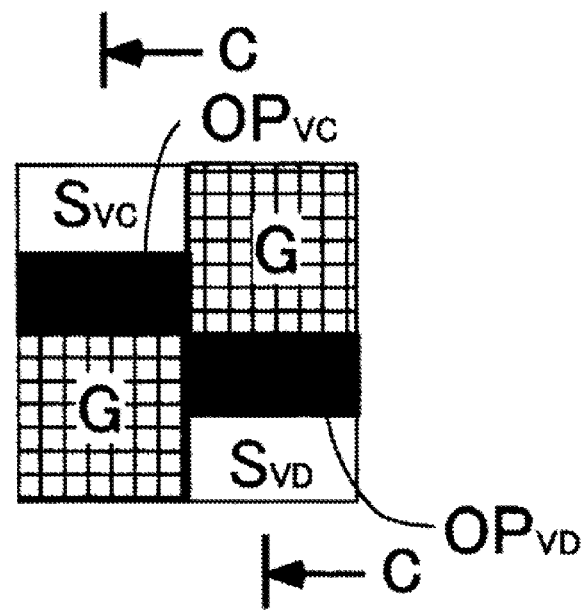
FIGS. 5A and 5B are a front view and a sectional view of other focus detection pixels disposed in the image pickup element.
Figure 5B:
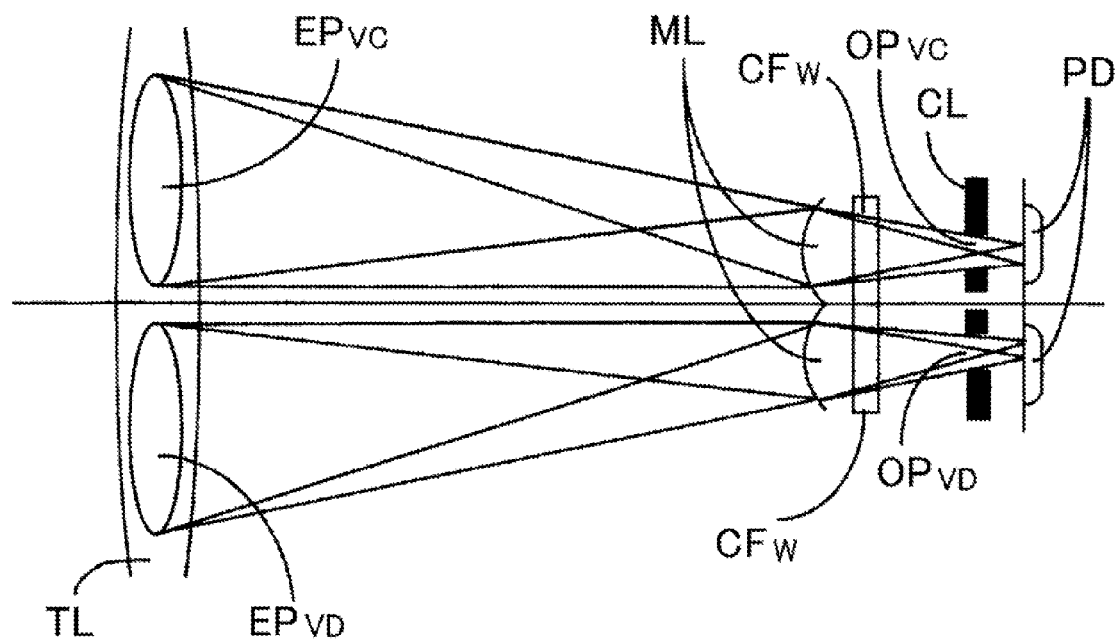

FIG. 5A shows a pixel arrangement of 2 rows×2 columns including focus detection pixels which perform pupil division of the image pickup optical system in the vertical direction (longitudinal direction in which a short side of the image pickup element 106 extends). Among the pixels of 2 rows×2 columns shown in FIG. 3A, the R and B pixels are partially replaced by the focus detection pixels while the G pixels are left as image pickup pixels. In FIG. 5B, the focus detection pixels are denoted by reference characters $S_{VC}$ and $S_{VD}$.

FIG. 5B shows a C-C section of the focus detection pixels shown in FIG. 5A. The microlens ML and the photoelectric converting part PD in the focus detection pixel are same in structure as the microlens ML and the photoelectric converting part PD of the image pickup pixel shown in FIG. 3B.

The focus detection pixel $S_{VC}$ has a stop aperture $OP_{VC}$ formed so as to be shifted to a lower side, and receives a light flux that has passed through an upper side exit pupil area $EP_{VC}$ of the exit pupil of the image pickup optical system TL. On the other hand, the focus detection pixel $S_{VD}$ has a stop aperture $OP_{VD}$ shifted to an upper side (side opposite to the stop aperture $OP_{VC}$), and receives a light flux that has passed through a lower side exit pupil area $EP_{VD}$ of the exit pupil of the image pickup optical system TL. Thus, the focus detection pixels $S_{VC}$ and $S_{VD}$ can receive two images (upper and lower separated images) of the same object to photoelectrically convert the two images.

In the image pickup element 106, plural focus detection pixels $S_{VC}$ are regularly arranged in the vertical direction. Hereinafter, one of the two images which is formed on the plural focus detection pixels $S_{VC}$ is referred to as "C image". Plural focus detection pixels $S_{VD}$ are also regularly arranged in the vertical direction. The other one of the two images which is formed on the plural focus detection pixels $S_{VD}$ is referred to as "D image". Detecting a phase difference as a shift amount (including a shift direction) between two image signals corresponding to the photoelectrically converted C and D images enables calculation of a defocus amount (including a defocus direction) indicating a focus state of the image pickup optical system.

Figure 6:
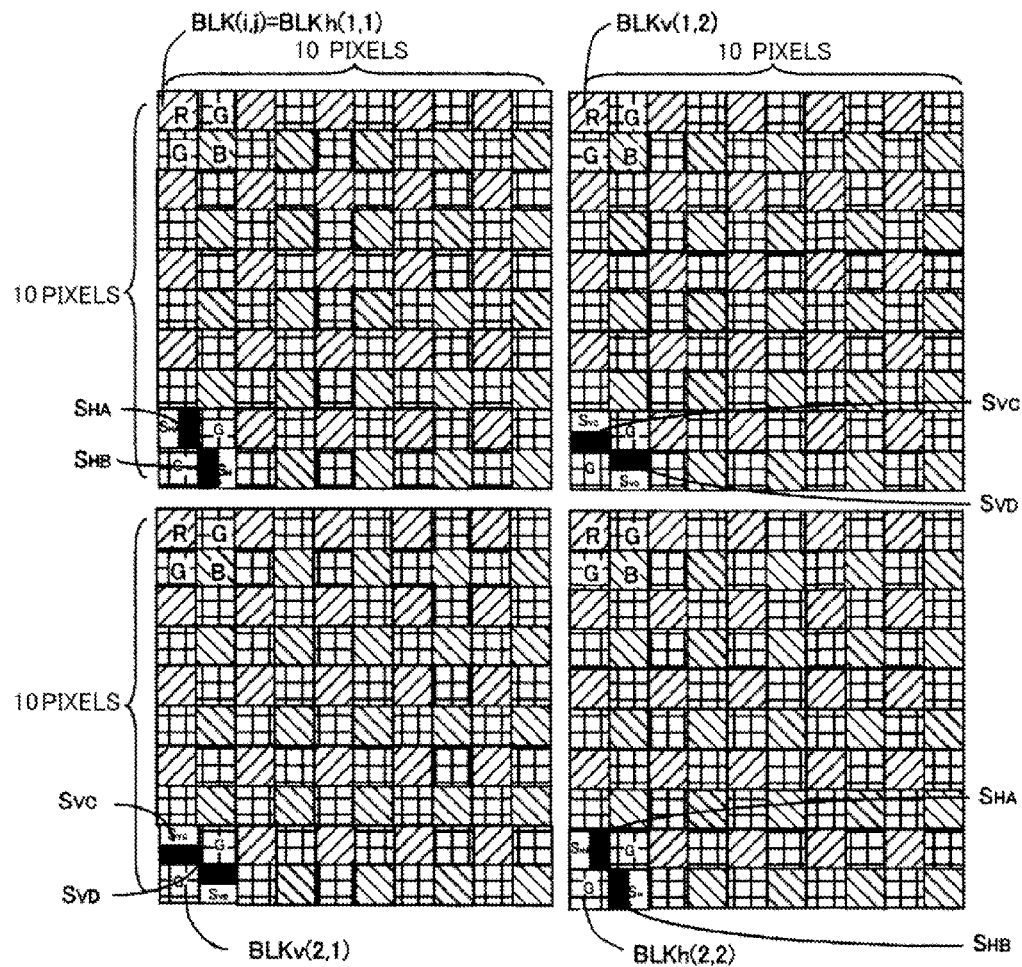
FIG. 6 shows a minimum unit pixel arrangement in the image pickup element.
Figure 7:
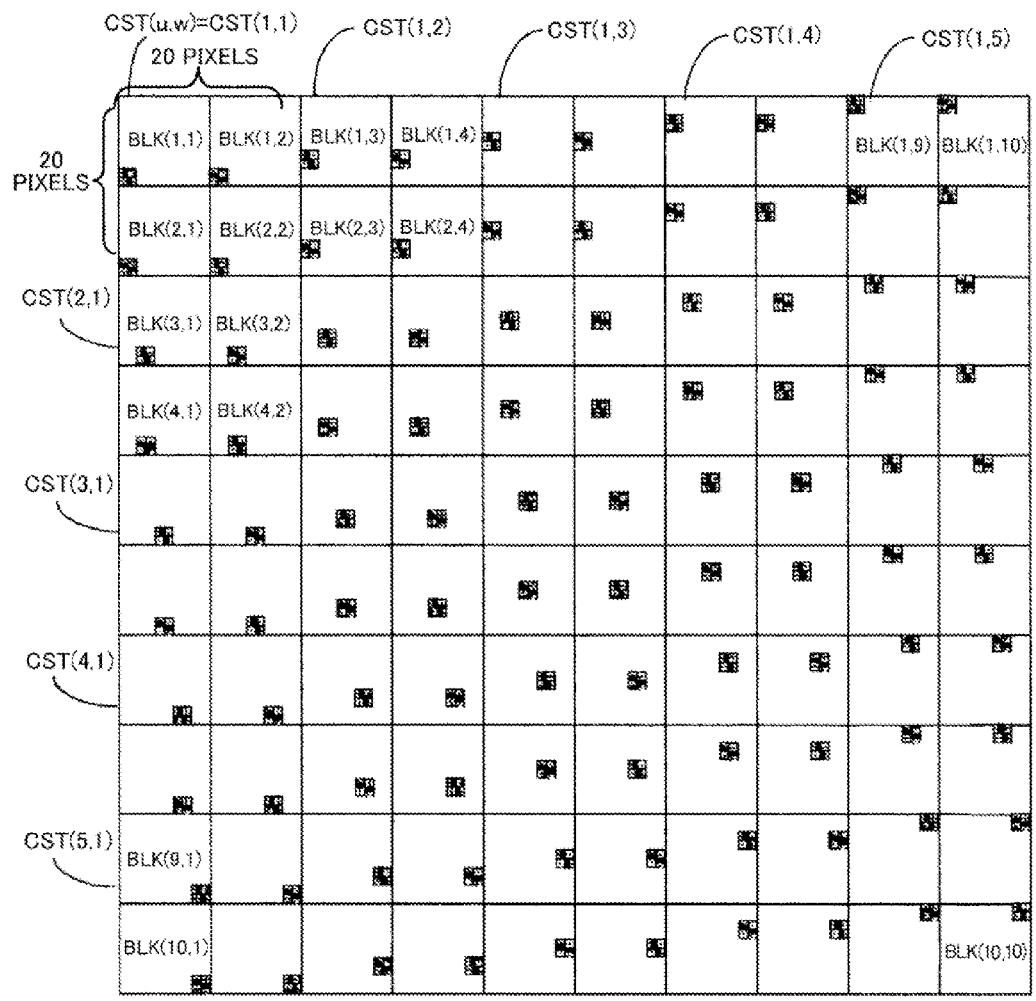
FIG. 7 shows an upper level unit pixel arrangement in the image pickup element.
Figure 8:
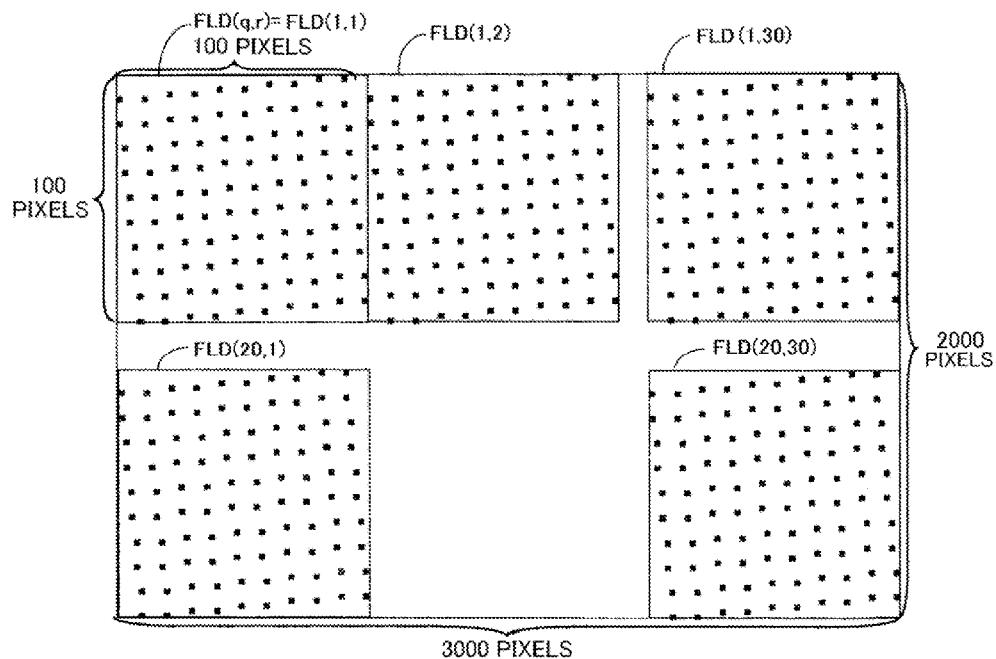
FIG. 8 shows a pixel arrangement in an entire area in the image pickup element.

FIGS. 6 to 8 show arrangement rule examples of the image pickup pixels and the focus detection pixels shown in FIGS. 3A to 5B.

FIG. 6 shows an example of a minimum unit pixel arrangement rule when the focus detection pixels are discretely arranged between the image pickup pixels. In FIG. 6, a square area of 10 rows×10 columns (=100 pixels) is defined as one block. In a left upper block BLKh (1, 1), left lowest R and B pixels are replaced by a set of the focus detection pixels $S_{HA}$ and $S_{HB}$ which performs pupil division in the horizontal direction.

In a block BLKv (1, 2) right next to the block BLKh (1, 1), left lowest R and B pixels are replaced by a set of the focus detection pixels $S_{VC}$ and $S_{VD}$ which performs pupil division in the vertical direction. A pixel arrangement in a block BLKv (2, 1) located lower adjacent to the block BLKh (1, 1) is identical to that in the block BLKv (1, 2). Further, a pixel arrangement in a block BLKh (2, 2) right next to the block BLKv (2, 1) is identical to that in the block BLKh(1, 1).

When such an arrangement rule is generalized, in a block BLK (i, j), the focus detection pixels for pupil division in the horizontal direction are arranged if a value of i+j is an even number, while the focus detection pixels for pupil division in the vertical direction are arranged if the value of i+j is an odd number. Then, 2×2=4 blocks, in other words, an area of 20 rows×20 columns (=400 pixels) is defined as a cluster which is a more upper level pixel arrangement unit than the block.

FIG. 7 shows an example of a pixel arrangement rule on a cluster basis. The cluster is expressed by CST (u, w). In FIG. 7, a most upper left cluster which is constituted by 20 rows×20 columns (=400 pixels) is referred to as CST (1, 1). In the cluster CST (1, 1), left lowest R and B pixels of each block are replaced by the focus detection pixels $S_{HA}$ and $S_{HB}$ or the focus detection pixels $S_{VC}$ and $S_{VD}$.

In a cluster CST (1, 2) right next to the cluster CST (1, 1), the focus detection pixels in each block are disposed at positions shifted by two pixels in the upper direction with respect to the cluster CST (1, 1). In a cluster CST (2, 1) located lower adjacent to the cluster CST (1, 1), the focus detection pixels in each block are disposed at positions shifted by two pixels in the right direction with respect to the cluster CST (1, 1). Repeated application of the rule enables acquisition of a pixel arrangement shown in FIG. 7.

This arrangement rule is generalized as follows. Coordinates of the focus detection pixels are defined by forming the four pixels including the G pixels shown in FIG. 4A or 5A into one unit (pair) and using coordinates of the left upper pixel of the unit. Coordinates in each block are expressed by defining coordinates of a left upper pixel as (1, 1) and defining the lower direction and the right direction as positive directions.

When the aforementioned definitions are applied, in the cluster CST (u, w), a horizontal coordinate of a focus detection pixel pair in each block is 2×u−1, and a vertical coordinate thereof is 11−2×w. Then, an area of 5×5 (=25) clusters shown in FIG. 7, in other words, an area of 100 rows×100 columns (=10000 pixels) is defined as a field which is a more upper level pixel arrangement unit than the cluster.

FIG. 8 shows an example of a pixel arrangement rule on a field basis. The field is expressed by FLD (q, r). In FIG. 8, a most upper left field constituted by 100 rows×100 columns (=10000 pixels) is referred to as FLD (1, 1). In this embodiment, all fields FLD (q, r) have pixel arrangements similar to that of the field FLD (1, 1).

Thus, when arranging 30 FLDs (1, 1) in the horizontal direction and 20 FLDs (1, 1) in the vertical direction, an image pickup area of 3000 columns×2000 rows (=6000000 pixels) includes 600 fields. Thus, the focus detection pixels can be uniformly distributed in the entire image pickup area.

Figure 9:
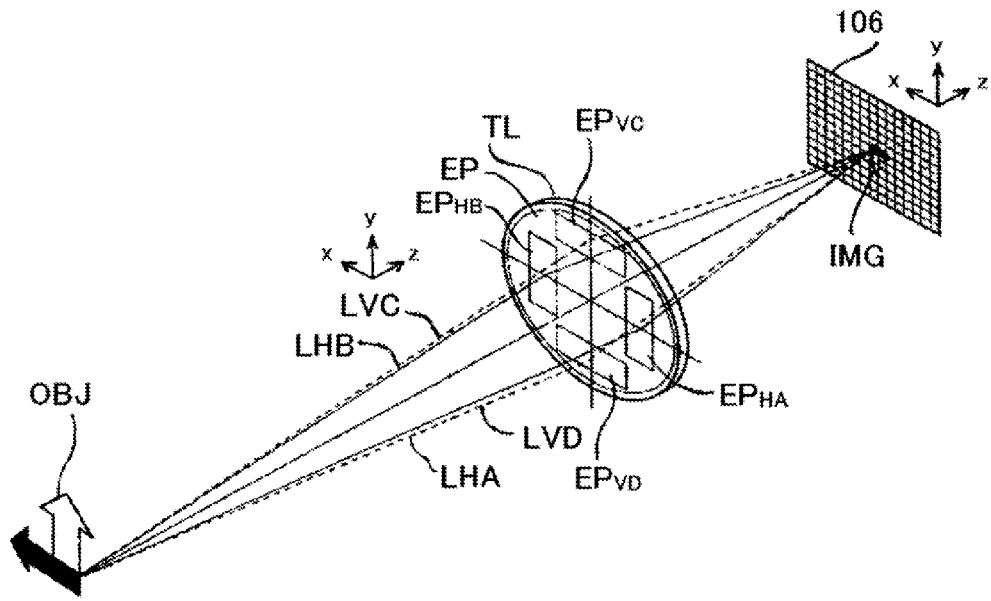
FIG. 9 is a conceptual view showing a pupil dividing function of the image pickup element.

FIG. 9 shows the pupil division function of the image pickup element 106. Reference character TL denotes the image pickup optical system, reference character OBJ denotes an object, and reference character IMG denotes an object image.

The image pickup pixel receives, as described above referring to FIGS. 3A and 3B, a light flux that has passed through the entire area of the exit pupil EP of the image pickup optical system TL. On the other hand, as described above referring to FIGS. 4A and 4B and FIGS. 5A and 5B, the focus detection pixel has the pupil division function. Specifically, the focus detection pixel $S_{HA}$ shown in FIG. 4A receives a light flux LHA that has passed through the left side exit pupil area $EP_{HA}$ when viewed from the image pickup element 106 toward an image side end of the image pickup optical system TL. Similarly, the focus detection pixels $S_{HB}$, $S_{VC}$, and $S_{VD}$ respectively receive light fluxes LHB, LHC and LHD that have passed through the right, upper and lower side exit pupil areas $EP_{HB}$, $EP_{VC}$ and $EP_{VD}$.

The focus detection pixels are uniformly distributed in the entire area of the image pickup element 106, and hence focus detection can be performed in the entire image pickup area.

Figure 10:
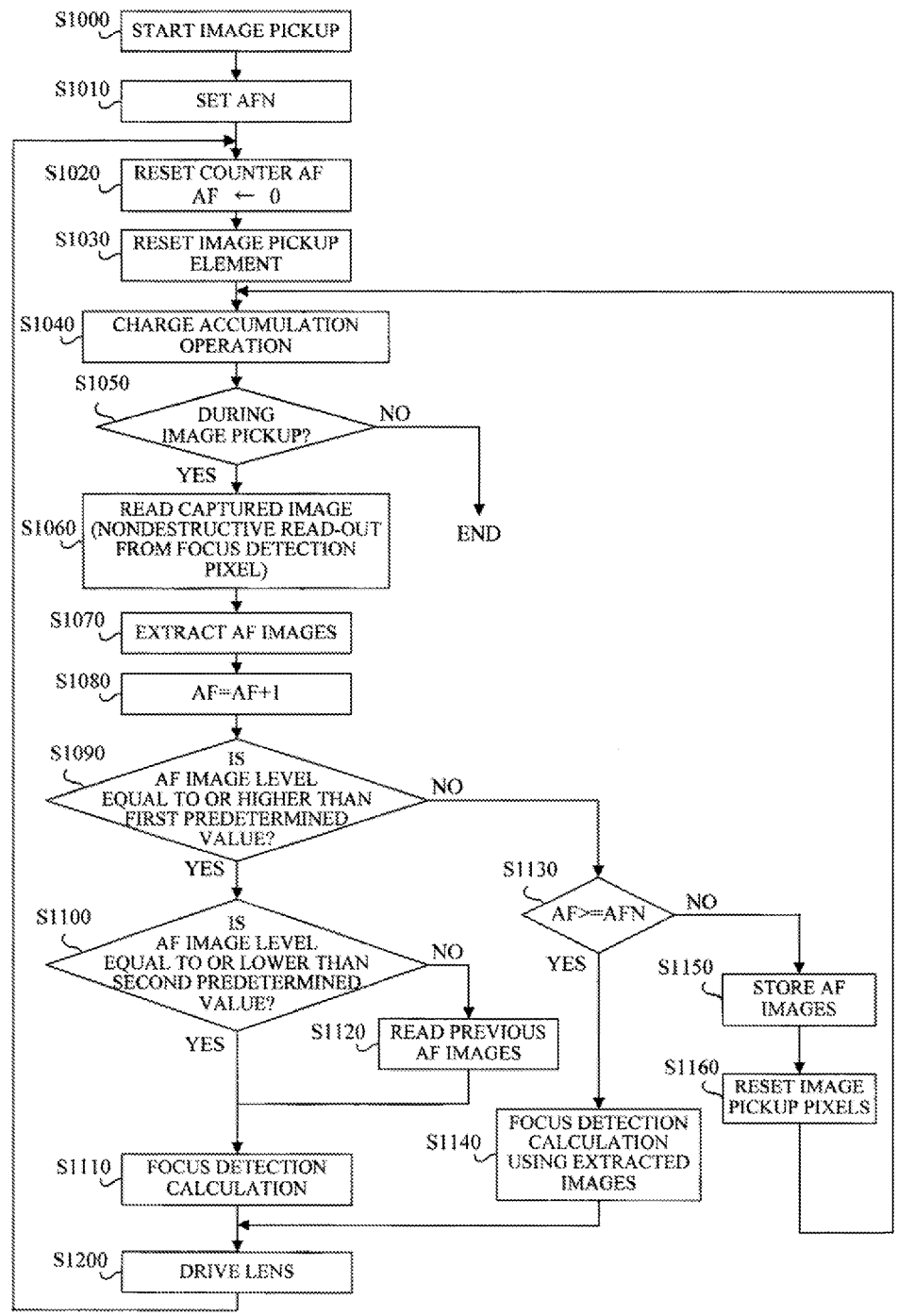
FIG. 10 is a flowchart showing processing of charge accumulation control in the camera of Embodiment 1.

A flowchart of FIG. 10 shows charge accumulation control processing of the image pickup element 106 in the camera of this embodiment. Description will be made of a case where output signals (pixel signals) of the focus detection pixels are added by electrical hardware. The camera microprocessor 112 executes the charge accumulation control processing according to a computer program.

At Step (hereinafter abbreviated to S) 1000, the camera microprocessor 112 starts drive of the image pickup element 106 (that is, image pickup) via the image pickup circuit 11.

At S1010, the camera microprocessor 112 sets an accumulation addition number AFN which is a number of repeating a charge accumulation operation for AF of the focus detection pixel (in other words, a number of adding accumulated charges of the focus detection pixel). The setting of the accumulation addition number AFN is carried out by reading a value from a memory area such as a mask ROM area or an EEPROM area in the camera. The accumulation addition number AFN may be set from an external accessory via communication between the accessory and the camera.

Next, at S1020, the camera microprocessor 112 resets a counter AF for counting a number of the charge accumulation operation of the focus detection pixel to 0.

Next, at S1030, the camera microprocessor 112 resets the image pickup element 106 to initialize the image pickup pixels and the focus detection pixels.

Next, at S1040, the camera microprocessor 112 causes the image pickup element 106 (in other words, the image pickup pixels and the focus detection pixels) to perform the charge accumulation operation. At this Step, the image pickup pixels and the focus detection pixels perform the charge accumulation operations for a same predetermined time period. Repeating of the processing shown by this flowchart at a predetermined cycle causes the image pickup pixels and the focus detection pixels to repeat the charge accumulation operations for the predetermined time period.

Next, at S1050, the camera microprocessor 112 determines whether or not the image pickup element 106 is being set to an image pickup state (that is, during image pickup). If the camera is performing image pickup, the camera microprocessor 112 proceeds to S1060. If the camera is not performing image pickup, the processing is finished.

At S1060, the camera microprocessor 112 reads out a pixel signal corresponding to charges accumulated by the charge accumulation operations for the predetermined time period from each of the image pickup pixels and each of the focus detection pixels in the image pickup element 106. At least read-out of the pixel signal from the focus detection pixel is carried out by nondestructive read-out in which the accumulated charge is read out while the accumulated charge is kept.

In other words, the image pickup element 106 in this embodiment has a configuration capable of performing the nondestructive read-out of the pixel signal from the focus detection pixel. The pixel signals from the image pickup pixels and the focus detection pixels are collectively described as "captured image" in FIG. 10.

The pixel signal is read out from the image pickup pixel at the predetermined cycle (in other words, after each charge accumulation operation) during the repeating of the processing shown by this flowchart at the predetermined cycle. The pixel signal obtained by one charge accumulation operation of the image pickup pixel is used as a first pixel signal for generating one frame image. In other words, the pixel signal from the image pickup pixel is detected as a signal for image generation in each frame.

On the other hand, the pixel signal is read out from the focus detection pixel after each charge accumulation operation of the predetermined cycle. However, when the processing shown by this flowchart is repeated at the predetermined cycle, the pixel signal read out from the focus detection pixel corresponds to an accumulated pixel signal (second pixel signal: hereinafter referred to as "image signal") corresponding to charges accumulated in the focus detection pixel during plural charge accumulation operations with the nondestructive read-out.

Next, at S1070, the camera microprocessor 112 extracts the image signals ("AF images" in the figure) of the focus detection pixels from all read out pixel signals.

Next, at S1080, the camera microprocessor 112 increments the counter AF indicating the number of the charge accumulation operations of the focus detection pixels by 1.

Next, at S1090, the camera microprocessor 112 determines whether or not a level of the image signals (accumulated pixel signals) obtained from the focus detection signals is equal to or higher than a first predetermined value. If the level of the image signals is equal to or higher than the first predetermined value, the camera microprocessor 112 determines that image signals having a sufficient level are obtained, and then proceeds to S1100. On the other hand, if the level of the image signals is lower than the first predetermined value, the camera microprocessor 112 determines that the level of the image signals is insufficient, and then proceeds to step S1130.

At S1100, the camera microprocessor 112 determines whether or not the level of the image signals from the focus detection pixels is equal to or lower than a second predetermined value which is larger than the first predetermined value. If the level of the image signals is equal to or lower than the second predetermined value, the camera microprocessor 112 determines that the obtained image signals do not include a region where image information has been lost, and then proceeds to step S1110. On the other hand, if the level of the image signals includes a portion higher than the second predetermined value, the camera microprocessor 112 determines that the image signals include the region where the image information has been lost due to an excessively high signal level, and then proceeds to S1120.

At S1120, the camera microprocessor 112 reads out an image signal previously read out and stored in the memory area because the image signals read out this time from the focus detection pixels include the region where the image information has been lost. Then, the camera microprocessor 112 proceeds to S1110.

At S1110, the camera microprocessor 112 performs focus detection calculation based on the image signals (accumulated pixel signals) obtained from the focus detection pixels. Specifically, the camera microprocessor 112 calculates a phase difference between the two image signals obtained from the focus detection pixels $S_{HA}$ and $S_{HB}$ or the focus detection pixels $S_{VC}$ and $S_{VD}$ and calculates a defocus amount based on the phase difference. Then, the camera microprocessor 112 proceeds to S1200.

Thus, in this embodiment, when the level of the image signals obtained from the focus detection pixels by one charge accumulation operation does not reach the first predetermined value or higher, the image signals which are accumulated pixel signals obtained by plural charge accumulation operations of the focus detection pixels are output for focus control. In other words, the image signals from the focus detection pixels are detected as signals for focus control at a detection cycle different from a detection cycle for the pixel signals from the image pickup pixels, that is, after each plural frames.

At S1130, the camera microprocessor 112 determines whether or not the counter AF is equal to or larger than the accumulation addition number AFN. If the counter AF is equal to or larger than the accumulation addition number AFN, the camera microprocessor 112 determines that the charge accumulation operation of the focus detection pixels for a longest accumulation time period has been performed, and then proceeds to S1140. On the other hand, if the counter AF is smaller than the accumulation addition number AFN, the camera microprocessor 112 determines that the charge accumulation operation can be continued more, and then proceeds to step S1150.

At S1140, the number of the charge accumulation operations of the focus detection pixels has reached a maximum charge accumulation number while the level of the image signals from the focus detection pixels do not reach a predetermined signal level. Thus, the camera microprocessor 112 performs focus detection calculation using the image signals ("extracted images" in the figure) from the focus detection pixels stored in the memory area. Then, the camera microprocessor 112 proceeds to S1200.

At S1150, the camera microprocessor 112 stores the image signals ("AF images" in the figure) from the focus detection pixels into the memory area. Then, the camera microprocessor 112 proceeds to S1160.

At S1160, the camera microprocessor 112 resets the accumulated charges of only the image pickup pixels in the image pickup element 106, and then returns to S1040.

At S1200, the camera microprocessor 112 calculates a driving amount of the focus lens from the defocus amount obtained by the focus detection calculation. Then, the camera microprocessor 112 sends a focus control command to the lens microprocessor 201 so as to move the focus lens by the driving amount. The lens microprocessor 201 drives the focus lens to an in-focus position via the lens drive circuit 23. Thus, the focus control is performed. Then, the camera microprocessor 112 returns to S1020.

In this embodiment, there is no need to vary pixel signal read-out processing between the image pickup pixels and the focus detection pixels since the pixel signals are read out from the image pickup pixels and the focus detection pixels without differentiating these pixels from each other. As a result, a circuit configuration of the camera microprocessor 112 as a signal processor can be simplified.

Moreover, for the focus detection pixels, plural charge accumulation operations are continuously performed without resetting accumulated charges until the focus detection calculation is performed. Therefore, a signal level of the image signals used for focus control can be increased without increasing a noise level of the image signals.

The above embodiment has been described the case where an upper limit of the charge accumulation operation of the focus detection pixels is set by the number of times of the charge accumulation operations. However, the charge accumulation operation may be limited by a charge accumulation time period. In other words, a signal obtained by plural charge accumulation operations of the focus detection pixels until the number of times of the charge accumulation operations each being performed for a predetermined time period or the entire charge accumulation time period reaches a predetermined value may be output as the second pixel signal.

[Embodiment 2]

A second embodiment (Embodiment 2) of the present invention will be described bellow. Descriptions in this embodiment similar to those of Embodiment 1 will be omitted.

Figure 11A:
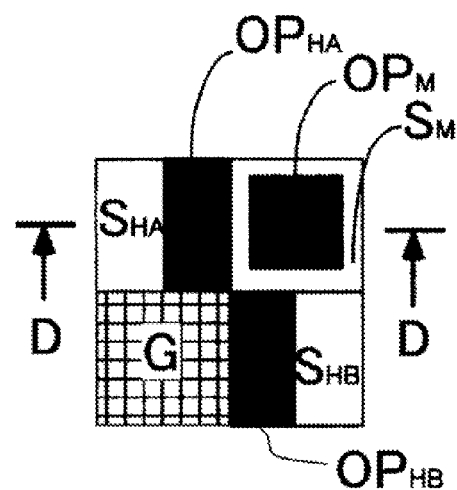
FIGS. 11A and 11B are a front view and a sectional view of focus detection pixels of an image pickup element in a camera which is Embodiment 2 of the present invention.
Figure 11B:
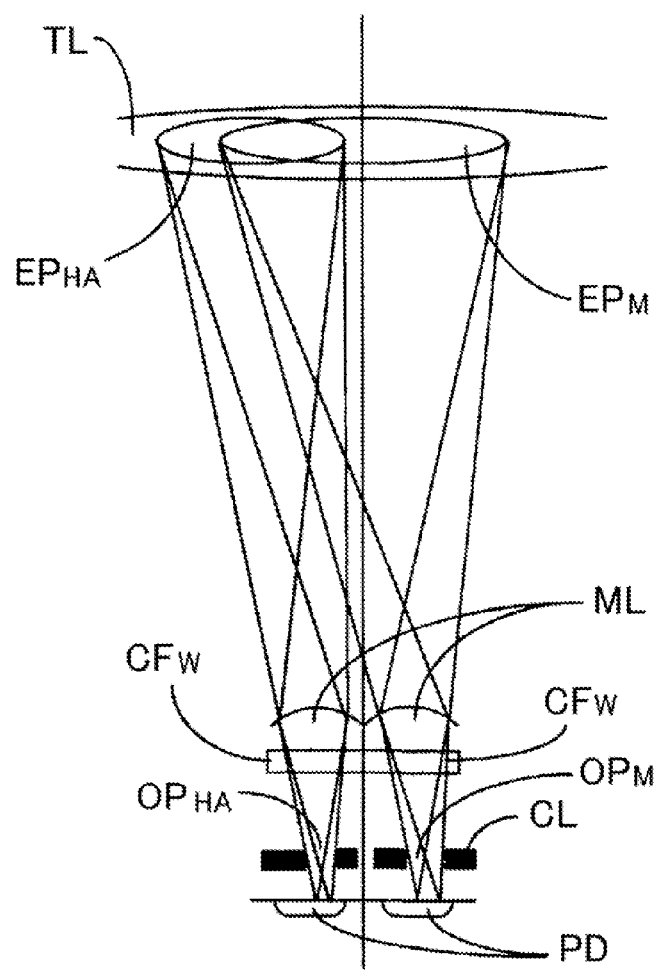

FIGS. 11A and 11B show a case where a monitor pixel different from the image pickup pixel and the focus detection pixel is added to the arrangement and structure, which are shown in FIGS. 4A and 4B in Embodiment 1, of the focus detection pixels for performing the pupil division in the horizontal direction (lateral direction) of the image pickup optical system. FIG. 11B shows a D-D section of a focus detection pixel $S_{HA}$ and a monitor pixel $S_M$ shown in FIG. 11A.

As in the case of an output signal of the focus detection pixel $S_{HA}$, an output signal of the monitor pixel $S_M$ is not used for image generation. Thus, in the monitor pixel $S_M$, as in the case of the focus detection pixel $S_{HA}$, a transparent (white) film $CF_W$ is provided in place of a color film. In order to match sensitivity of the monitor pixel SM with that of the focus detection pixel $S_{HA}$, an aperture area of a stop aperture $OP_M$ formed in the wiring layer CL is set equal to that of the stop aperture $OP_{HA}$ of the focus detection pixel $S_{HA}$.

The monitor pixel $S_M$ receives a light flux that has passed through an exit pupil area $EP_M$ which is a central part of the exit pupil of the image pickup optical system TL.

FIGS. 11A and 11B show the case where the monitor pixel is disposed at a position corresponding to a G pixel in Bayer arrangement. However, the monitor pixel may be disposed at a position corresponding to an R pixel or a B pixel which are close to the focus detection pixel.

Figure 12:
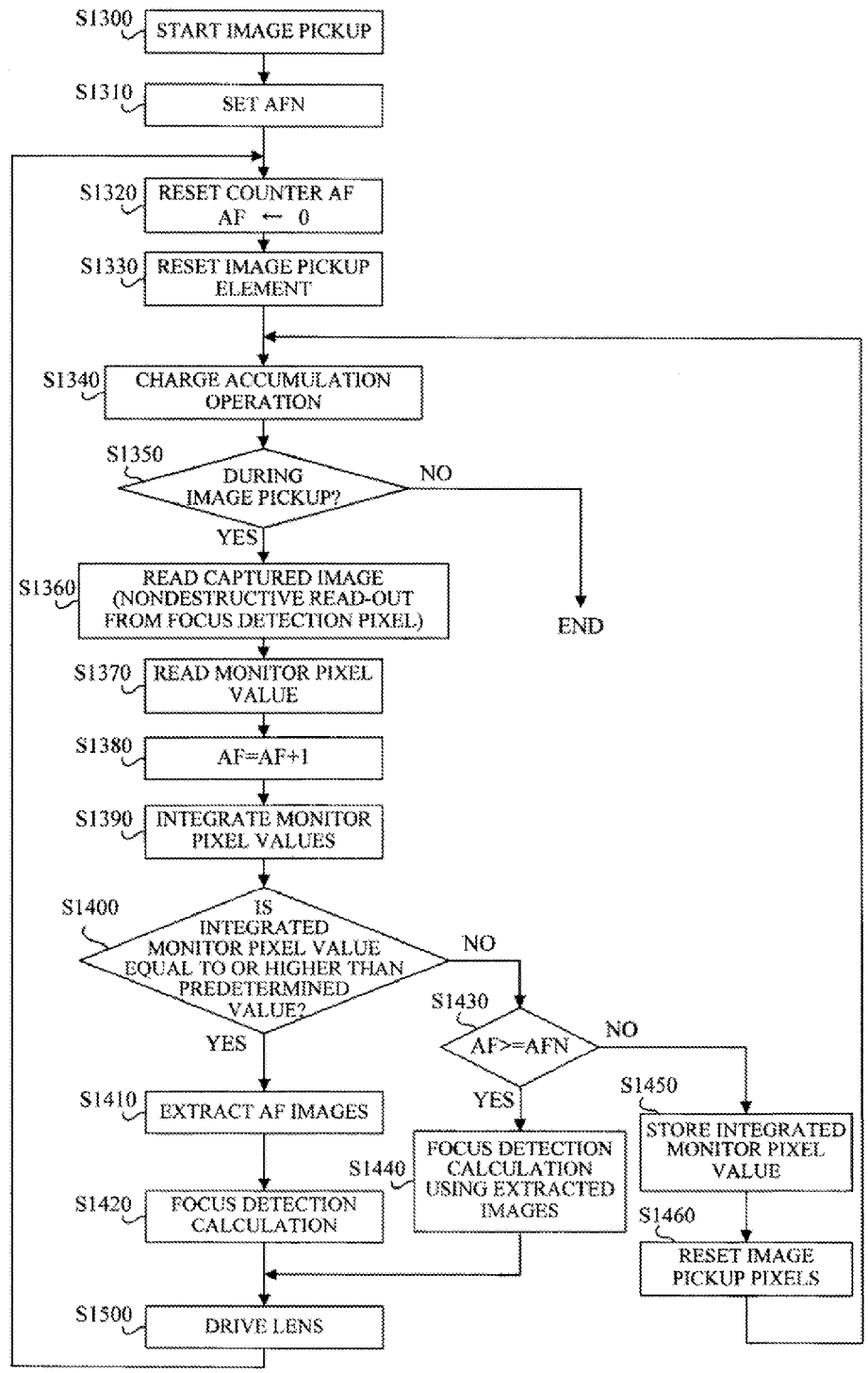
FIG. 12 is a flowchart of processing of charge accumulation control in the camera of Embodiment 2.

A flowchart of FIG. 12 shows charge accumulation control processing of an image pickup element 106 in a camera of Embodiment 2. A case where output signals (pixel signals) from the focus detection pixels are added by electrical hardware will be described. A camera microprocessor 112 executes the charge accumulation control processing according to a computer program.

At Step 1300, the camera microprocessor 112 starts drive of the image pickup element 106 (that is, image pickup) via an image pickup circuit 11.

Subsequent processes of S1310 to S1360 are the same as those of S1010 to S1060 described in Embodiment 1. However, at S1330, a monitor pixel is also initialized. When determining at S1350 that image pickup is being performed (that is, during image pickup), after performing the process of S1360, the camera microprocessor 112 proceeds to S1370. The image pickup element 106 in this embodiment has a configuration capable of performing nondestructive read-out of the pixel signals from the focus detection pixels. When determining at S1350 that image pickup is not being performed, the processing is finished.

At S1370, the camera microprocessor 112 reads out a monitor signal (hereinafter referred to as "monitor pixel value") which is a pixel signal from the monitor pixel for determining an accumulation level of the focus detection pixels.

Next, at S1380, the camera microprocessor 112 increments a counter AF indicating a number of charge accumulation operations of the focus detection pixels by 1.

Next, at S1390, the camera microprocessor 112 performs integration processing of the monitor pixel values.

Next, at S1400, the camera microprocessor 112 determines whether or not an integrated value of the monitor pixel values is equal to or higher than a predetermined value. If the integrated value is equal to or higher than the predetermined value, the camera microprocessor 112 determines that image signals of a sufficient level are obtained from the focus detection pixels, and then proceeds to S1410. On the other hand, if the integrated value of the monitor pixel values is lower than the predetermined value, the camera microprocessor 112 determines that the level of the image signals is insufficient, and then proceeds to step S1430.

At S1410, the camera microprocessor 112 extracts the image signals as accumulated pixel signals of the focus detection pixels from all pixel signals read out at S1360.

In this manner, in this embodiment, the monitor pixel values read out from the monitor pixel after each charge accumulation operation of a predetermined time period are integrated. When the monitor pixel value does not reach the predetermined value or higher by one charge accumulation operation, the image signals obtained by plural charge accumulation operations of the focus detection pixels until the level of the integrated monitor pixel value reaches the predetermined value or higher are output as image signals for focus control.

Next, at S1420, the camera microprocessor 112 performs focus detection calculation based on the extracted image signals from the focus detection pixels, and then proceeds to S1500.

At S1430, the camera microprocessor 112 determines whether or not the counter AF indicating the number of the performed charge accumulation operations of the focus detection pixels is equal to or larger than an accumulation addition number AFN. If the counter AF is equal to or larger than the accumulation addition number AFN, the camera microprocessor 112 determines that the charge accumulation operation of the focus detection pixels for a longest accumulation time period has been performed, and then proceeds to S1440. On the other hand, if the counter AF is smaller than the accumulation addition number AFN, the camera microprocessor 112 determines that the charge accumulation operation can be continued more, and then proceeds to S1450.

At S1440, the number of the charge accumulation operations of the focus detection pixels has reached a maximum charge accumulation number while the level of the image signals from the focus detection pixels do not reach a predetermined signal level. Thus, the camera microprocessor 112 performs focus detection calculation using the image signals ("extracted images" in the figure) from the focus detection pixels stored in the memory area. Then, the camera microprocessor 112 proceeds to S1500.

At S1450, the camera microprocessor 112 stores the integrated value of the pixel values of the monitor pixel into the memory area. Then, the camera microprocessor 112 proceeds to S1460.

At S1460, the camera microprocessor 112 resets the accumulated charges of only the image pickup pixels in the image pickup element 106, and then returns to S1340.

At S1500, as in the case of S1200 in Embodiment 1, the camera microcomputer 112 calculates a driving amount of a focus lens, and drives the focus lens to an in-focus position via a lens microprocessor 201. Then, the camera microprocessor 112 returns to S1320.

According to this embodiment, when reading out the pixel signals from the image pickup element, the level of the pixel value (integrated value) of the monitor pixel disposed in the vicinity of the focus detection pixel is checked. This enables determination of the level of the image signals obtained from the focus detection pixels greater in number than the monitor pixel.

[Embodiment 3]

A third embodiment (Embodiment 3) of the present invention will be described bellow. Descriptions in this embodiment similar to those in Embodiment 1 will be omitted.

Figure 13:
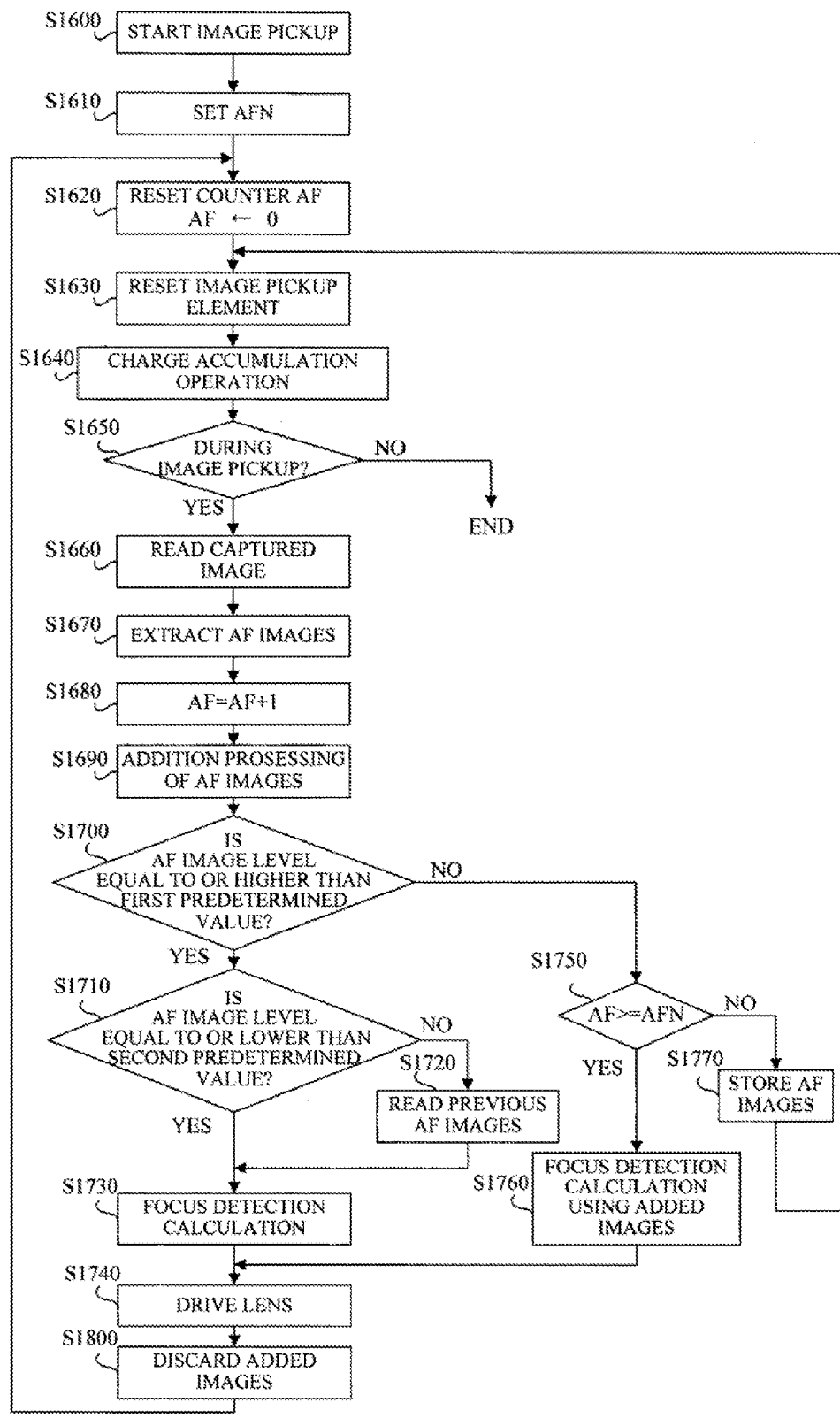
FIG. 13 is a flowchart showing processing of charge accumulation control in a camera which is Embodiment 3 of the present invention.

A flowchart of FIG. 13 shows charge accumulation control processing of an image pickup element 106 in a camera of this embodiment. Description will be made of a case where output signals (pixel signals) of focus detection pixels are added by electrical hardware. A camera microprocessor 112 executes the charge accumulation control processing according to a computer program.

At Step 1600, the camera microprocessor 112 starts drive of the image pickup element 106 (that is, image pickup) via an image pickup circuit 11. Subsequent processes of S1610 to S1650 are the same as those of S1010 to S1050 in Embodiment 1. When determining at S1650 that image pickup is being performed (that is, during image pickup), the camera microprocessor 112 proceeds to S1660. When determining that image pickup is not being performed, the processing is finished.

At S1660, the camera microprocessor 112 reads out accumulated charges (pixel signals) from image pickup pixels and the focus detection pixels in the image pickup element 106.

Next, at S1670, the camera microprocessor 112 extracts the pixel signals of the focus detection pixels from all read out pixel signals.

Next, atS, the camera microprocessor 112 increments a counter AF indicating a number of charge accumulation operations of the focus detection pixels by 1.

Next, at S1690, the camera microprocessor 112 performs addition processing (synthesis processing) of the pixel signals (image signals: "AF images" in the figure) read out from the focus detection pixels by image calculation processing.

Next, at S1700, the camera microprocessor 112 determines whether or not a level (added value or synthesized value) of the image signals from the focus detection pixels is equal to or higher than a first predetermined value. If the level of the image signals is equal to or higher than the first predetermined value, the camera microprocessor 112 determines that image signals having a sufficient level are obtained, and then proceeds to S1710. On the other hand, if the level of the image signals is lower than the first predetermined value, the camera microprocessor 112 determines that the level of the image signals is insufficient, and then proceeds to step S1750.

At S1710, the camera microprocessor 112 determines whether or not the level of the image signals from the focus detection pixels is equal to or lower than a second predetermined value which is larger than the first predetermined value. If the level of the image signals is equal to or lower than the second predetermined value, the camera microprocessor 112 determines that the obtained image signals do not include a region where image information has been lost, and then proceeds to step S1730. On the other hand, if the level of the image signals includes a portion higher than the second predetermined value, the camera microprocessor 112 determines that the image signals include the region where the image information has been lost due to an excessively high signal level, and then proceeds to S1720.

At S1720, the camera microprocessor 112 reads out an image signal previously read out and stored in a memory area because the image signals read out this time from the focus detection pixels include the region where the image information has been lost. Then, the camera microprocessor 112 proceeds to S1730.

At S1730, the camera microprocessor 112 performs focus detection calculation based on the image signals (added value or synthesized value) from the focus detection pixels. In this embodiment, when the level of the image signals does not reach the first predetermined value or higher by one charge accumulation operation, the camera microprocessor 112 synthesizes (adds) the image signals read out from the focus detection pixels after each of plural charge accumulation operations to generate image signals (second pixel signals) for focus control. Then, the camera microprocessor 112 proceeds to S1740.

At S1750, the camera microprocessor 112 determines whether or not the counter AF is equal to or larger than an accumulation addition number AFN. If the counter AF is equal to or larger than the accumulation addition number AFN, the camera microprocessor 112 determines that the charge accumulation operation of the focus detection pixels for a longest accumulation time period has been performed, and then proceeds to S1760. On the other hand, if the counter AF is smaller than the accumulation addition number AFN, the camera microprocessor 112 determines that the charge accumulation operation can be continued more, and then proceeds to step S1770.

At S1760, the number of the charge accumulation operations of the focus detection pixels has reached a maximum charge accumulation number while the level of the image signals from the focus detection pixels do not reach a predetermined signal level. Thus, the camera microprocessor 112 performs focus detection calculation using the image signals (added values: "added images" in the figure) from the focus detection pixels stored in the memory area. Then, the camera microprocessor 112 proceeds to S1740.

At S1770, the camera microprocessor 112 stores the image signals ("AF images" in the figure) from the focus detection pixels into the memory area. Then, the camera microprocessor 112 returns to S1630.

At S1740, as in the case of S1200 in Embodiment 1, the camera microprocessor 112 calculates a driving amount of a focus lens, and drives the focus lens to an in-focus position via a lens microprocessor 201. Then, the camera microprocessor 112 returns to S1800.

At S1800, the camera microprocessor 112 discards the image signals from the focus detection pixels stored in the memory area. Then, the camera microprocessor 112 returns to S1620.

In this embodiment, pixel signal read-out is performed at a predetermined sampling rate during image pickup, and pixel signals of the focus detection pixels are extracted from the read out pixel signals. Thus, the same charge accumulation processing and the same read-out processing are only required to be performed for all pixels (image pickup pixels and focus detection pixels) in the image pickup element, which enables simple control.

Further, after the pixel signal read-out, for the focus detection pixels, the pixel signals (image signals) obtained by charge accumulation operations whose number of times corresponds to a plural number of times of signal read-out from the image pickup pixels are synthesized (added) by image calculation, and focus detection calculation is performed by using the synthesized image signal. Thus, without needing any circuit as hardware for synthesizing the pixel signals, the level of the image signals from the focus detection pixels can be improved.

According to each of Embodiments, the first pixel signal used for image generation is obtained by a charge accumulation operation of the image pickup pixels for a predetermined time period, while the second pixel signal used for focus control is obtained by plural charge accumulation operations of the focus detection pixels (in other words, a charge accumulation operation for a time period longer than the predetermined time period). Thus, effective sensitivity and a low-brightness detection limit of the focus detection pixels in which an exposure amount shortage occurs more easily as compared with the image pickup pixels can be improved. Moreover, the image pickup pixels and the focus detection pixels only repeat the charge accumulation operations for the same predetermined time period, and hence the circuit configuration for processing signals from these pixels can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

For example, in each of Embodiments, a lens interchangeable type single lens reflex digital camera has been described.

However, the present invention can be applied to a lens-integrated digital still camera or video camera.

This application claims the benefit of Japanese Patent Application No. 2008-264059, filed on Oct. 10, 2008, which is hereby incorporated by reference herein in its entirety.

[Industrial Applicability]

The present invention can provide an image pickup apparatus capable of improving effective sensitivity and a low-brightness detection limit of focus detection pixels without using any complex circuit configuration.

The invention claimed is:

1. An image pickup apparatus comprising:
an image pickup element configured to include image pickup pixels and focus detection pixels, the image pickup pixels photoelectrically converting an object image formed by a light flux from an image pickup optical system, and the focus detection pixels photoelectrically converting two images formed by two divided light fluxes of the light flux from the image pickup optical system;
an image generator configured to generate an image based on first pixel signals;
a focus controller configured to perform focus control for the image pickup optical system based on second pixel signals; and
a signal processor configured to output signals read out from the image pickup pixels after each charge accumulation operation of the image pickup pixels for a predetermined time period as the first pixel signals, and to output signals read out from the focus detection pixels as the second pixel signals, wherein the signals read out from the focus detection pixels are obtained after plural charge accumulation operations in the image pickup element.

2. An image pickup apparatus according to claim 1,
wherein the image pickup element has a configuration allowing nondestructive read-out of signals from the focus detection pixels, and
wherein the signal processor reads out the signals from the image pickup pixels and the focus detection pixels after each charge accumulation operation, and outputs, when a level of accumulated pixel signals nondestructively read out from the focus detection pixels after each charge accumulation operation reaches a predetermined value or higher, the accumulated pixel signals as the second pixel signals.

3. An image pickup apparatus according to claim 2,
wherein the signal processor outputs the signals obtained by plural charge accumulation operations of the focus detection pixels performed until one of a number of times of the charge accumulation operations of the focus detection pixels and a charge accumulation time period of the focus detection pixels reaches a predetermined value or higher as the second pixel signal.

4. An image pickup apparatus according to claim 1,
wherein the signal processor reads out the signals from the image pickup pixels and the focus detection pixels after each charge accumulation operation, and synthesizes the signals read out from the focus detection pixels a plural number of times to generate the second pixel signals.

5. An image pickup apparatus according to claim 4,
wherein the signal processor outputs the signals obtained by plural charge accumulation operations of the focus detection pixels performed until one of a number of times of the charge accumulation operations of the focus detection pixels and a charge accumulation time period of the focus detection pixels reaches a predetermined value or higher as the second pixel signal.

6. An image pickup apparatus according to claim 1,
wherein the image pickup element includes a monitor pixel different from the image pickup pixel and the focus detection pixel, and
wherein the signal processor reads out a monitor signal from the monitor pixel after each charge accumulation operation to integrate the monitor signals, and outputs signals obtained by plural charge accumulation operations of the focus detection pixels performed until a level of the integrated monitor signal reaches a predetermined value or higher as the second pixel signals.

7. An image pickup apparatus according to claim 6,
wherein the signal processor outputs the signals obtained by plural charge accumulation operations of the focus detection pixels performed until one of a number of times of the charge accumulation operations of the focus detection pixels and a charge accumulation time period of the focus detection pixels reaches a predetermined value or higher as the second pixel signal.

8. An image pickup apparatus according to claim 1,
wherein the signal processor outputs the signals obtained by plural charge accumulation operations of the focus detection pixels performed until one of a number of times of the charge accumulation operations of the focus detection pixels and a charge accumulation time period of the focus detection pixels reaches a predetermined value or higher as the second pixel signal.

9. A method for controlling an image pickup apparatus including an image pickup element configured to include image pickup pixels and focus detection pixels, the image pickup pixels photoelectrically converting an object image formed by a light flux from an optical pickup optical system and the focus detection pixels photoelectrically converting two images formed by two divided light fluxes of the light flux from the image pickup optical system, the method comprising:
a step of generating an image based on first pixel signals;
a step of performing focus control for the image pickup optical system based on second pixel signals; and
a step of outputting signals read out from the image pickup pixels after each charge accumulation operation of the image pickup pixels for a predetermined time period as the first pixel signals, and of outputting signals read out from the focus detection pixels as the second pixel signals, wherein the signals read out from the focus detection pixels are obtained after plural charge accumulation operations in the image pickup element.

* * * * *